Feb. 22, 1949.  J. O. BERNDTSON  2,462,457
MULTIPLE CLUTCH MECHANISM
Filed Jan. 15, 1944  7 Sheets-Sheet 1

Inventor
John O. Berndtson
By Rockwell & Bartholow
Attorneys

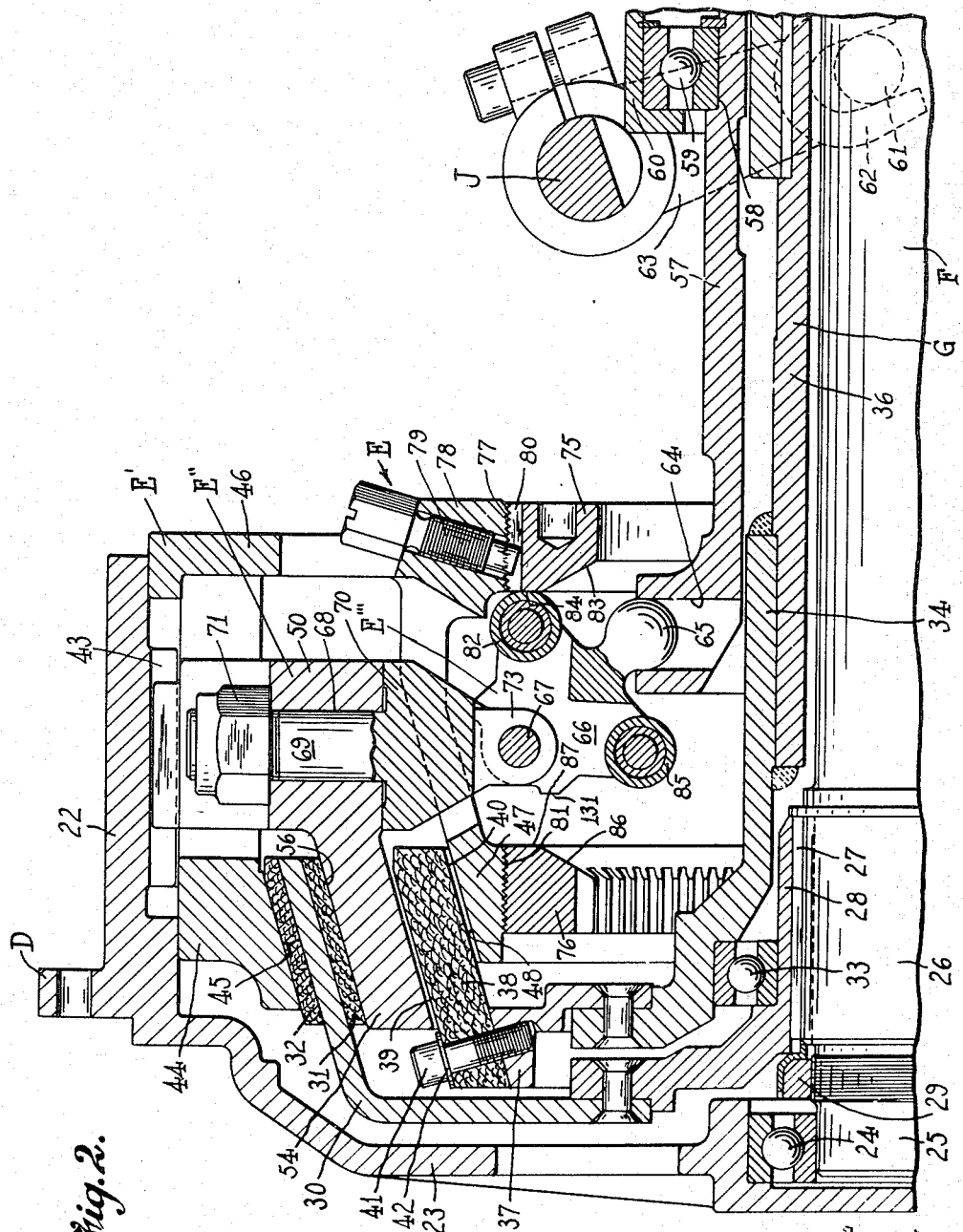

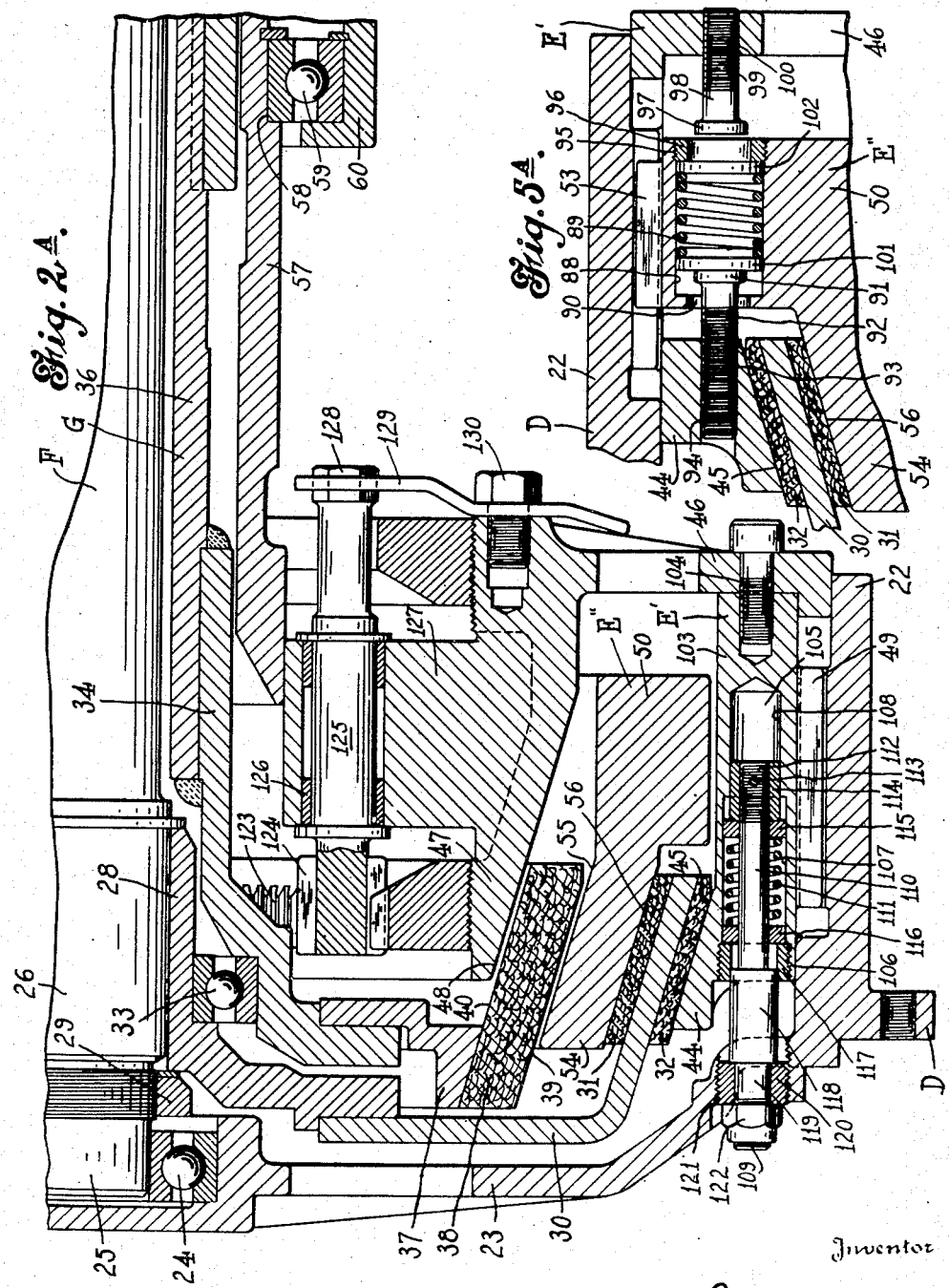

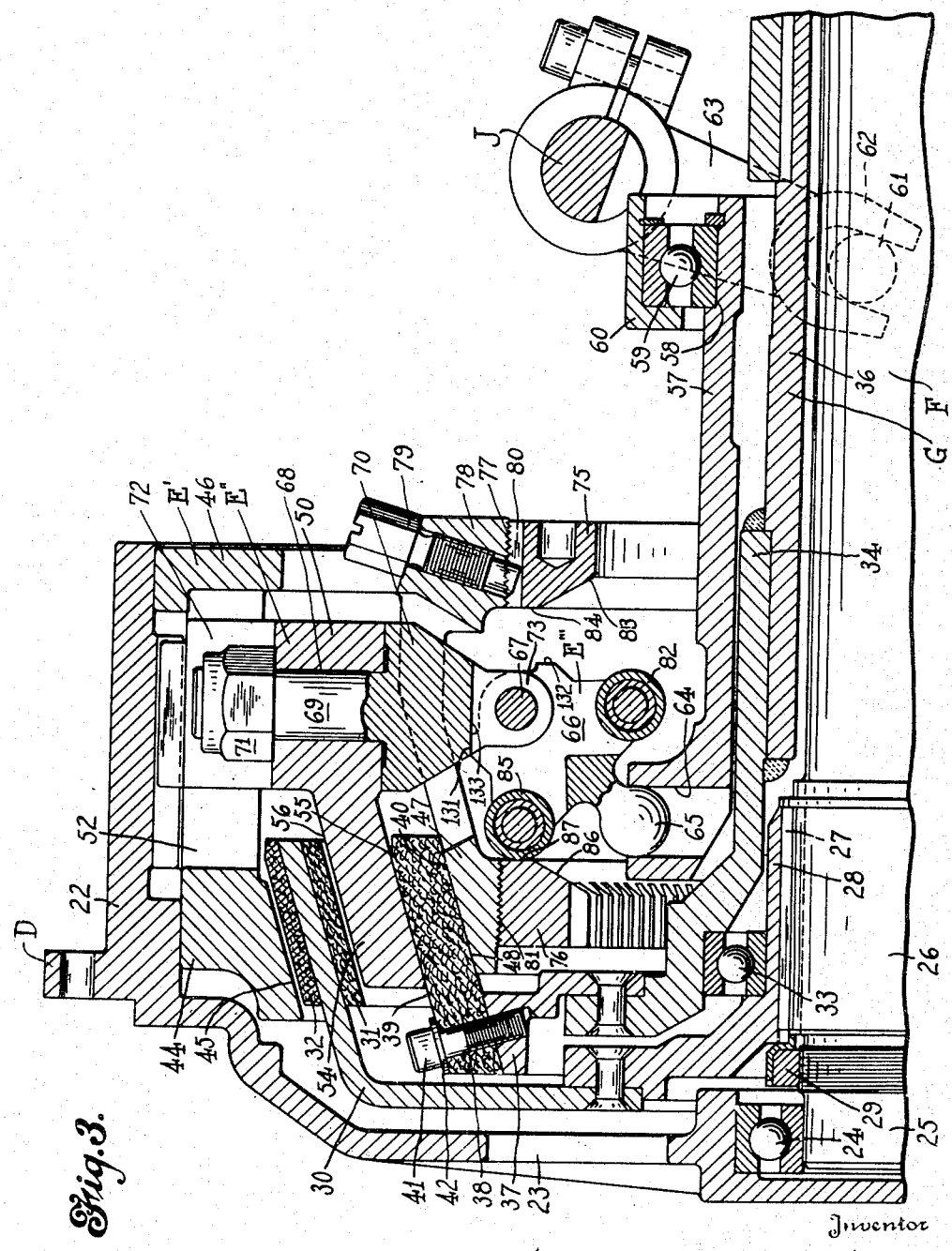

Feb. 22, 1949.　　　　　J. O. BERNDTSON　　　　　2,462,457
MULTIPLE CLUTCH MECHANISM
Filed Jan. 15, 1944　　　　　　　　　　　　　　7 Sheets-Sheet 5

Inventor
John O. Berndtson
By Rockwell & Bartholow
Attorneys

Feb. 22, 1949.  J. O. BERNDTSON  2,462,457
MULTIPLE CLUTCH MECHANISM
Filed Jan. 15, 1944  7 Sheets-Sheet 6

Inventor
John O. Berndtson
By Rochelle & Heath
Attorneys

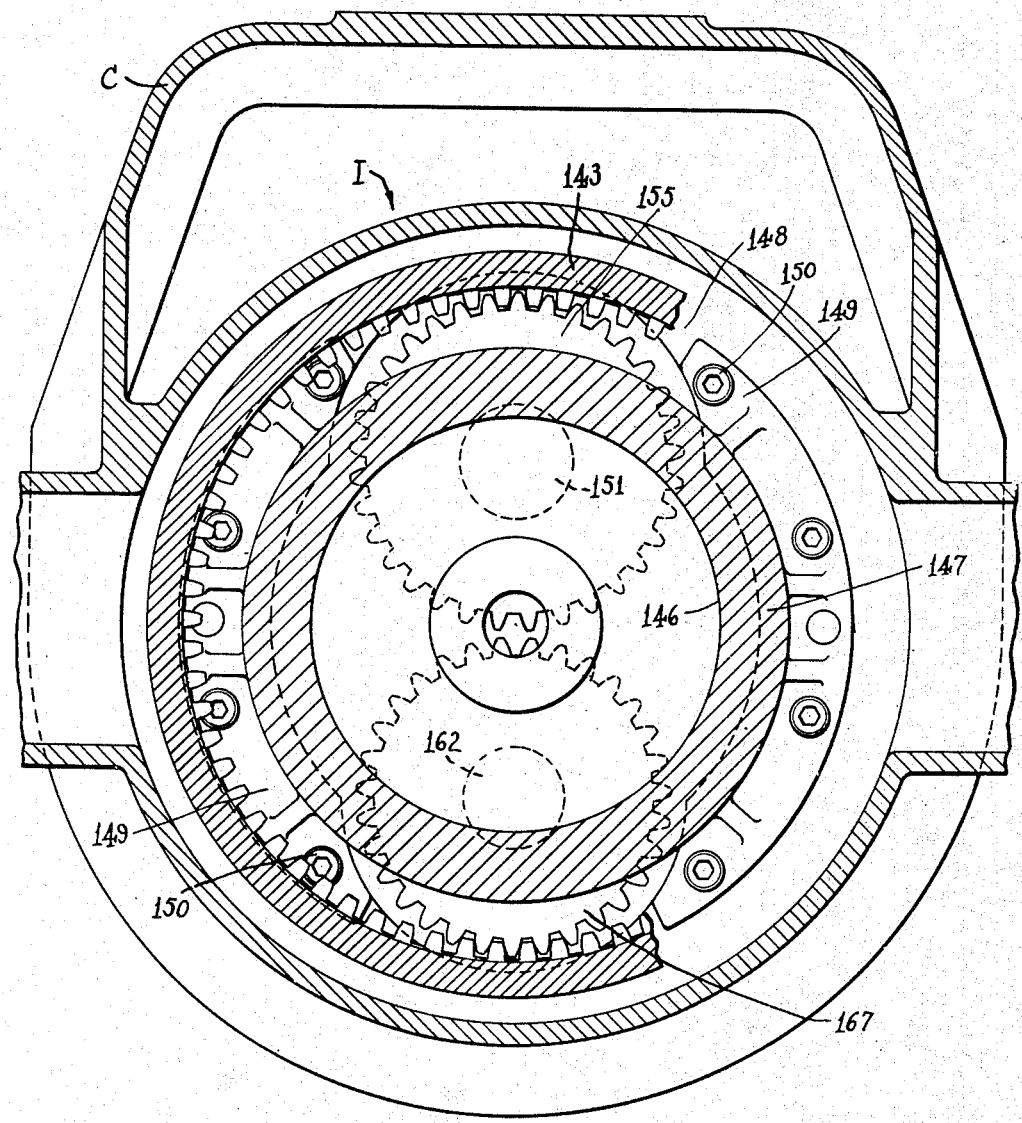

Patented Feb. 22, 1949

2,462,457

UNITED STATES PATENT OFFICE 2,462,457

MULTIPLE-CLUTCH MECHANISM

John O. Berndtson, Short Beach, Conn., assignor to The Snow-Nabstedt Gear Corporation, New Haven, Conn., a corporation of Connecticut Application January 15, 1944, Serial No. 518,326

23 Claims. (Cl. 192—48)

This invention relates to improvements in transmission mechanism and is particularly directed to improvements in transmission mechanism for marine use although not limited to that application.

One of the objects is to provide a simple, compact, and sturdy transmission mechanism, adapted to connect a marine engine to a propeller shaft in such a manner that forward and reverse drive of the propeller shaft can be readily obtained as desired.

Another object is to provide an improved marine transmission of the type in which there is a reduction of speed between the main shaft of the transmission and the driven shaft thereof, the latter shaft being the one which is connected to the propeller shaft or other power takeoff.

Another object is to provide an improved transmission of the type just mentioned for effecting forward and reverse drive where concentric drive shafts are selectively operable through the operation of an improved selectively operable friction clutch mechanism.

A further purpose of the invention is to provide an improved and very satisfactory form of friction clutch mechanism which may be used to advantage for driving concentrically arranged shafts of a reverse gearing or similar mechanism.

To these and other ends, the invention consists in the novel features and combinations of parts to be hereinafter described and finally pointed out in the claims.

In the accompanying drawings:

Fig. 2 is a sectional view of certain parts shown in Fig. 1, on a larger scale, illustrating the position of the parts when the transmission is in position for forward drive;

Fig. 2A is a sectional view, supplementing the disclosure of Fig. 2 and also showing the parts in the forward drive position;

Fig. 3 is a view similar to Fig. 2, illustrating the position for reverse drive;

Fig. 5A is a view similar to Fig. 5, showing the parts in another position;

Fig. 7 is an enlarged section on line 7—7 of Fig. 1; and

In the marine transmission selected for illustration, the mechanism comprises a housing having a main or forward portion and a rear portion of somewhat less height, the main portion accommodating concentric shafts adapted to be driven from an engine-driven member in a selective manner through the use of a selectively operable friction clutch mechanism, the forward drive being accomplished through an inner shaft and the reverse drive through a surrounding tubular shaft. Mounted in the rear portion of the housing is an offset driven shaft and also reduction gearing connecting the offset or driven shaft with the selectively operable drive shafts. In the mechanism illustrated, the engine-driven member is arranged to be coupled directly to the flywheel of the engine, and the housing at its forward end is left open so as to be in communication with the housing of the engine, there being, however, a partition between the ends of the forward portion of the transmission housing which closes off a portion of said housing and prevents oil from leaking into the engine housing. In front of the partition just mentioned is the selectively operable friction clutch mechanism, whereby the engine-driven member, which is in the form of a cup arranged in the forward portion of the transmission housing and facing rearwardly, can be connected frictionally at will with the inner drive shaft which provides forward drive or with the outer hollow drive shaft through which reverse drive is obtained. Forward drive is accomplished by means of a pinion mounted on the rear end of the inner drive shaft and meshing with an internal gear carried by the offset shaft, and reverse drive is accomplished through a pinion operated from the rear end of the hollow drive shaft and meshing with a long pinion which, in turn, is meshed with the internal gear above mentioned.

Figure 6:
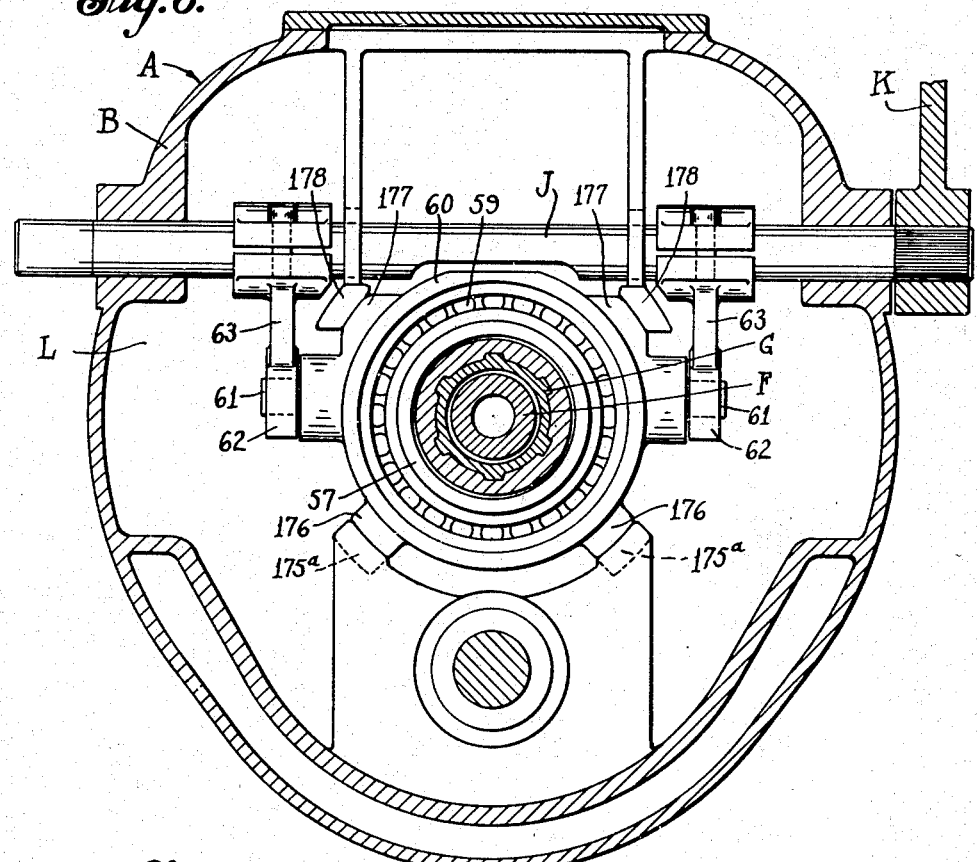
Fig. 6 is a section on line 6—6 of Fig. 1.
Figure 8:
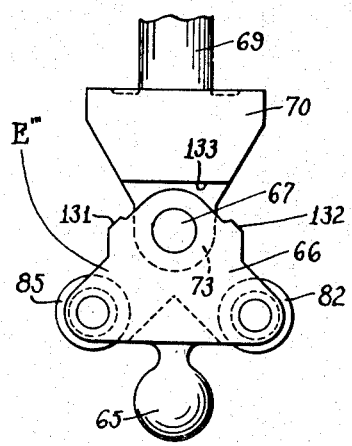
Fig. 8 is detail of a portion of the friction clutch actuating mechanism.

In the drawings, the housing of the transmission is shown at A, the same having a forward or main portion B and a rear portion C. The engine-driven member is shown at D, and this drives through the selectively operable friction clutch mechanism E, the inner drive shaft F, or the concentric hollow outer drive shaft G. Journaled in the rear-end portion of the housing is the offset or driven shaft H, which is connected with the drive shafts F, G through the reduction gearing I. The selectively operable friction clutch mechanism E is operable by turning a rock shaft J extending across the housing and operable by a member K at the exterior of the housing (Fig. 6). The rock shaft J is mounted in the housing rearwardly of a partition L which closes off the rear part of the forward housing portion B.

Now referring to the details, it will be noted that the engine-driven member D is in the shape of a cup facing rearwardly and located within the open front end 20 of housing portion B, the member D being, in this particular instance, fastened in any suitable manner to the engine flywheel which is indicated at 21. I do not limit myself, however, to this particular manner of mounting and driving the member D and it is understood that it can be driven from the engine or other power source in a variety of ways as conditions may dictate. The friction clutch mechanism E is mounted within the cup-shaped structure provided by the engine-driven member. The engine-driven member has a cylindrical wall or rim 22 and is provided with a front wall 23 rotatably mounted by means of an anti-friction bearing 24 around the forward reduced extremity 25 of shaft F. Rearwardly of the extremity 25, shaft F is provided with an enlarged portion 26, to which is keyed by a key 27 a hub member 28 clamped in position by a nut 29. The hub 28 is the hub of a friction member having an outstanding web 30 whose peripheral portion is bent inwardly and rearwardly to provide a cone-shaped rim having an inner friction surface 31 and an outer friction surface 32, these friction surfaces being provided by suitable friction material applied in any suitable manner to the web of the friction member.

Mounted by means of an anti-friction bearing 33, around a sleeve portion of hub 28, is a forward end section 34 forming a part of the tubular shaft G, said section being secured to the body 36 of shaft G in any appropriate manner as by brazing or welding. At its forward end, section 34 is formed to provide a hub, and to this hub is applied, in a suitable manner, an outstanding web 37, and to this web 37 is secured in a suitable manner a conical friction member 38 located within and concentrically of the cone friction member previously described. The friction member 38 may be constituted by a single block of molded friction material, the same having an outer cone friction surface 39 and an inner cone friction surface 40. This molded member may be secured to the supporting web thereof in any suitable manner, but, for purposes of illustration, I have shown it as being held in place on its web by a plurality of screws 41, these screws having threaded shanks engaging threaded sockets in the web and passing through holes in the molded piece and having under their heads suitable washers 42, bearing against the outer surface of the cone ring.

Figure 1:
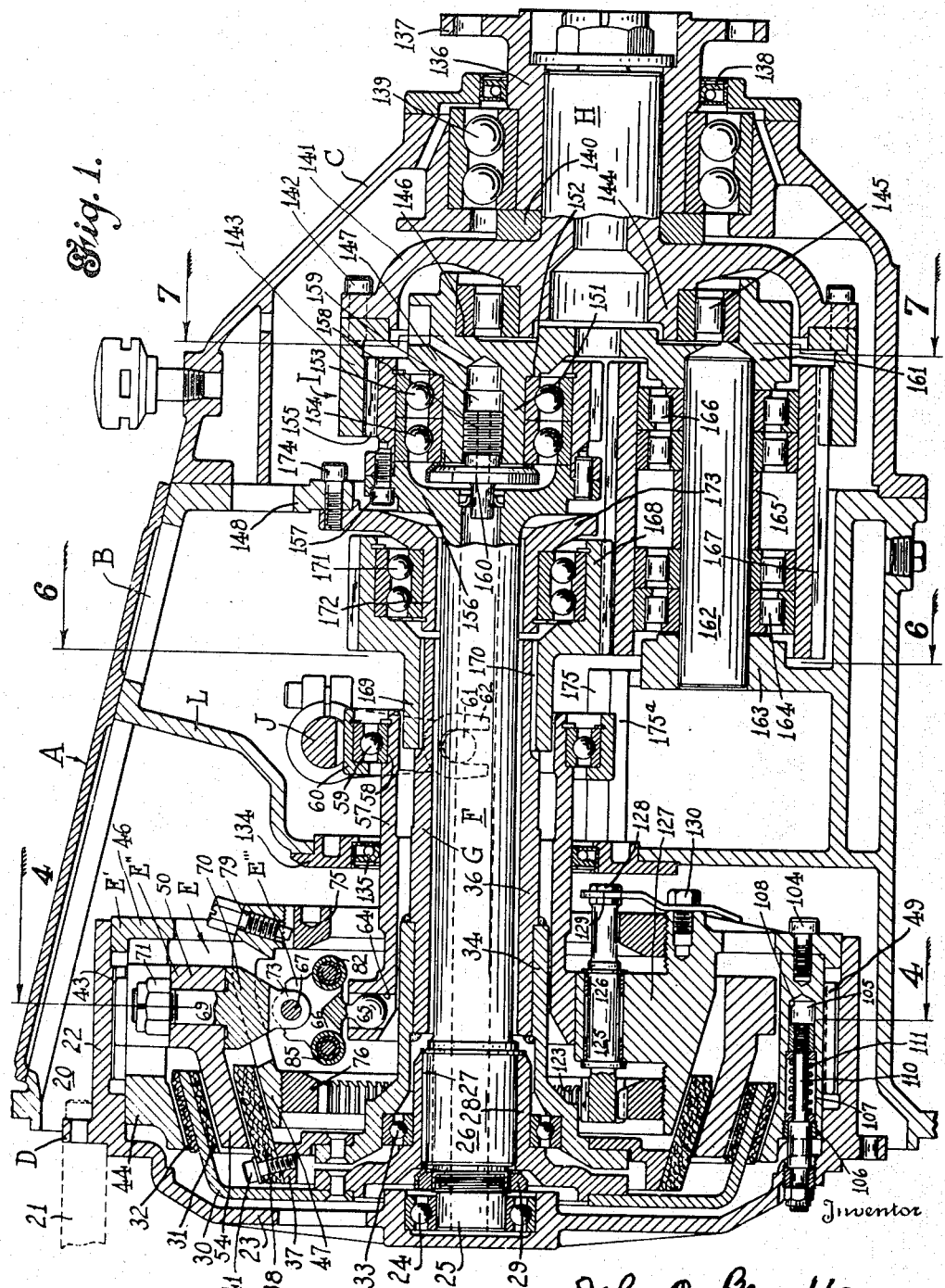
Fig. 1 is a vertical, longitudinal section of a transmission mechanism for marine use, embodying my improvements, the same being shown in neutral position.

For driving the shaft H from shaft F through the reduction gearing hereinafter described, the cone friction member 30, 31, and 32 which is secured to shaft F is adapted to be clamped between opposite friction surfaces carried by and rotating with the member D, and, for driving shaft H by means of shaft G, cone friction member 38, secured to said shaft, is adapted to be clamped between another pair of friction surfaces carried by member D. In Fig. 1, the parts are shown in neutral position, but, when the shaft J is swung to the position shown in Fig. 2, the friction clutch associated with the inner shaft F is actuated; and, when the shaft J is turned from neutral to the position shown in Fig. 3, the friction clutch associated with the shaft G is actuated. For accomplishing these results, the structure adapted for the selective clamping of the two cone friction members is preferably as now to be described.

The cylindrical rim portion 22 of member D is provided, upon its entire or substantially entire inner periphery, with longitudinal ribs or splines 43 enabling different clutch members to be splined to this member so as to rotate therewith but have a certain amount of free axial movement. There are two of these clutch members mounted within the cup of member D, one of these being an outer member generally indicated at E', and the other being an inner member indicated at E'' enclosed thereby. The member E' has a forward portion 44 (Fig. 2) provided with an inner conical surface 45 adapted to engage the friction material 32 of clutch member 30. The member E' also has a rear portion 46 in the form of a web, and in a zone which is radially inwardly on web 46 the latter carries, as an integral part thereof, a cone friction member or portion 47 having an outer cone friction surface 48 adapted to engage the inner surface of the molded friction member 38.

The clutch member E' is an annular member in the form of an open frame enclosing member E'' and having the two forwardly disposed cone rings provided respectively by the forward portion 44 and the friction member 47. On the periphery of the member E' are a plurality of longitudinal ribs 49 extending into the spaces between the splines 43 in order to permit member E' to be guided axially of member D.

Figure 4:
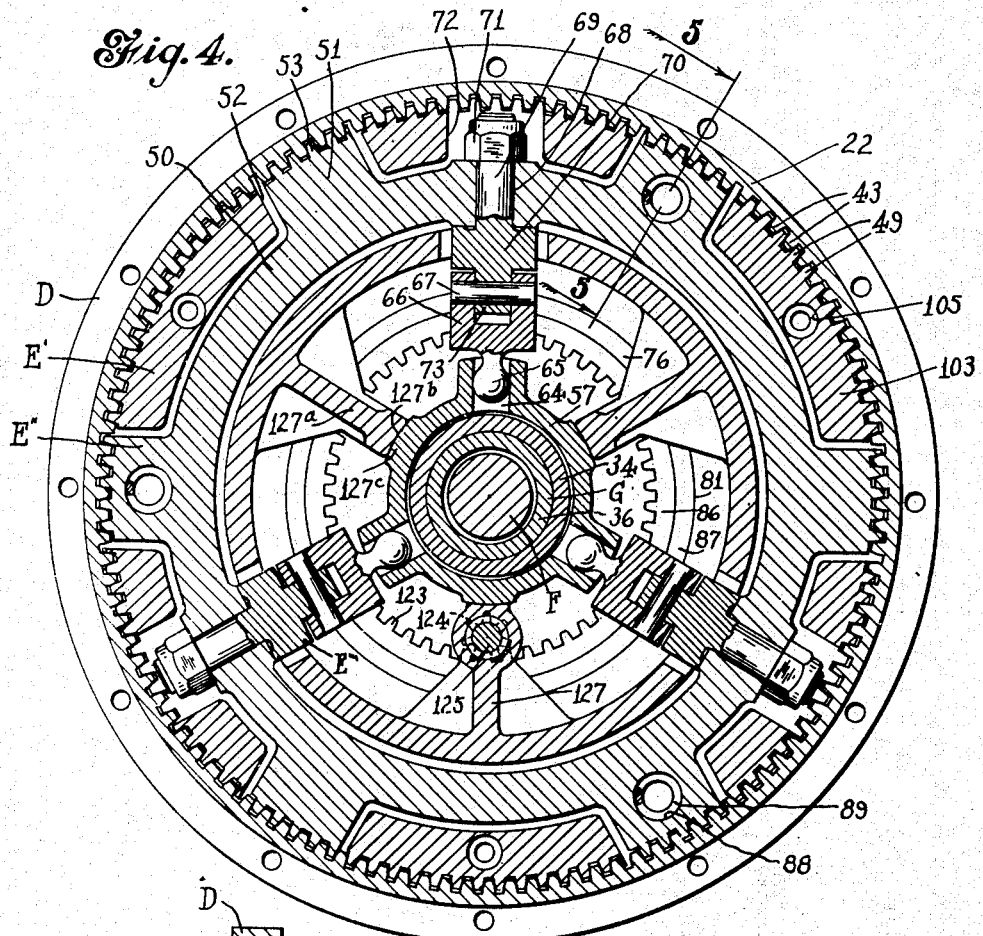
Fig. 4 is a section on line 4—4 of Fig. 1.

The member E'' is a ringlike member having a body 50 best shown in Fig. 4, provided with integral outstanding arms 51 at different circumferential points, these arms being received within cutaway portions 52 of member E' and being provided with guide ribs 53 engaged in the grooves between certain of the splines 43. Formed integrally with the body 50 and extending forwardly therefrom is a cone ring 54 adapted to cooperate with the friction ring 38 at the outer part thereof and provided for this purpose with an inner conical surface 55. The ring 54 is also provided with an outer conical surface 56 adapted to make contact with the friction lining 31 of member 30.

For the purpose of actuating the friction clutch mechanism E, the member E'' carries at different points in its circumference (preferably, three points) inwardly extending members generally indicated at E''' intended to be actuated by a longitudinally movable sleeve member 57. This sleeve member 57 embraces a portion of the tubular shaft G and is provided adjacent its rear end with a seat 58 for an anti-friction bearing 59, the outer race of which is engaged by a collar 60 having trunnions 61 which engage forks 62 carried by levers 63 rigid with the rock shaft J. At the forward end of the sleeve 57, the same is provided with radially disposed cutaway portions or sockets 64 in which are received spherical members or balls 65 projecting from and rigid with levers 66. These levers 66 are parts of the devices E''' abovementioned; and these levers 66 are pivoted to member E'' by means of pivot pins 67. By reference to Fig. 4, it will be seen that at three points in its circumference the member E'' is provided with through radial bores 68, receiving shanks 69 which act as positioning means for blocks 70 seated against the inner surface of the member E''. Each block 70 has a shank 69 projecting therefrom, and this shank is threaded to receive a nut 71 in order that the block 70 may be clamped in position at the inner face of member E'', each nut 71 being accommodated in a cutaway portion 72 provided in the member E'. Each block 70 is provided with an inwardly extending lug 73, and this lug holds pivot pin 67 by means of which the corresponding lever 66 is pivoted. It will be observed that the lever 66 is bifurcated, having legs straddling the lug 73 and engaged with the projecting ends of the pin 67. At its inner part, each lever 66 has a spherical projection 65 engaged with the actuating sleeve 57 in the manner previously described.

For actuating the friction clutch mechanism, each lever 66 is provided with means whereby it may be abutted against parts carried by the member E' for the purpose of shifting said member axially in opposite directions. In the example shown, each lever 66 is adapted to be abutted against a ring-like part 75 at the rear of member E' and against a ringlike member 76 adjacent the forward portion of said member. The part 75 is in the nature of an open ring embracing the sleeve 57 and having external screw threads 77 engaging threads formed internally on a part 78 of member E'. The screw threads permit axial adjustment of part 75 in a very precise manner and, after the part has been brought to the desired adjustment, it is held in position by means such as a clamping screw 79 whose inner end engages a groove 80 in part 75. There are a number of the grooves 80, spaced at appropriate distances around ring 75, but only one is shown in the drawings. The forward ring 76 is provided with external screw threads 81 engaging internal threads formed on portion 47 at its inner part. The ring 76 is adjustable in an axial direction by means hereinafter described.

Each of the levers 66 is adapted to be engaged with the ring 75 by means of a roller 82 mounted between the legs of the lever at its rear part and adapted to have movement in a forward and rearward direction as the lever is moved on its pivot 67. This roller 82 is adapted to engage a sloping surface 83 formed on ring 75 at the forward face thereof and, after moving over the sloping surface 83 the roller is adapted to make contact with a surface 84 on the ring 75. Similarly, each lever 66 is provided at its forward part with a roller 85 adapted to make rolling contact with a sloping surface 86 on ring 76 and thereafter to make contact with a surface 87 on ring 76.

Figure 5:
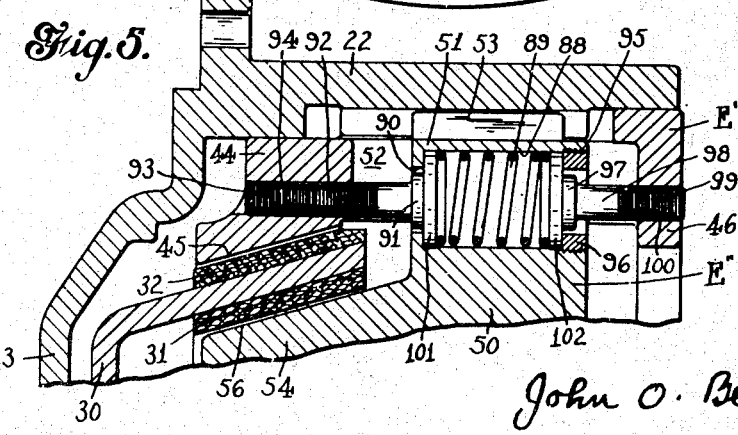
Fig. 5 is a section on line 5—5 of Fig. 4.

For the purpose of normally holding clutch member E" yieldingly in a predetermined axial relation to member E', a number of resilient pressure devices are employed, and, in the form shown there are three of these, the same having the arrangement and structure best shown in Figs. 4 and 5. It will be noted that member E" is provided with six of the arms 51 previously mentioned and that, in three of these, axial sockets 88 are provided, each of which receives a helical pressure spring 89. The socket 88 has at its forward end a restricted perforated portion 90 in which is received the head 91 of a plunger having a stem 92 provided with screw threads 93 and screwed into a socket 94 in portion 44 of member E'. At the opposite end of the socket 88, the same is provided with an internally threaded mouth portion 95 receiving a threaded plug 96 having an opening receiving a head 97 provided on a stem 98. The stem 98 extends in a rearward direction relatively to the mechanism and has screw threads 99 whereby it is secured in a tapped hole 100 provided in the rear portion 46 of member E'. At the left hand end (Fig. 5) of the socket, a disk 101 is retained in the socket against one end of the spring and is adapted to be abutted by the head 91, and, at the opposite end of the socket, a similar disk 102 is provided within the socket. It will be evident that the stems, or shanks, projecting rigidly from the forward and rear parts of member E', are adapted to be in contact with parts abutting the respective ends of the spring coil and that there is a tendency to hold members E' and E" in a predetermined relative axial position.

For the purpose of holding the clutch member E' normally in a yielding manner in a predetermined axial relationship to the engine-driven member D, a number of resilient pressure devices are employed, and, in the form shown, there are three of these, the same having the arrangement and structure best shown in Fig. 2A and Fig. 4. In an annular peripheral portion of member E', which is indicated at 103 and is preferably formed separately from the body of member E' and attached thereto by screws 104, three forwardly facing spring sockets 105 are provided. As best shown in Fig. 2A, each of these sockets is provided with an internally threaded mouth portion 106 and behind this mouth portion with a smooth bore portion 107 of somewhat less diameter, and behind the bore portion 107 with a smooth bore portion 108 which extends to the bottom of the socket. Mounted within this socket is a spring-pressed plunger 109 which is rigid with respect to member D, as by being made fast to the front wall 23 of said member. The plunger 10" has a stem portion 110 at its rear part surrounded by a helical spring 111, and at its extreme rear the plunger is provided with screw threads 112 which serve, together with a pin 113, for fastening in place on the plunger a sleeve 114 having a smooth outer surface which slides in the socket portion 108. In front of the sleeve 114, a washer 115 embraces portion 110 and abuts the right hand extremity of spring 111. The other extremity of the spring abuts a washer 116 which, with washer 115, may slide in the portion 107 of the socket. In front of the washer 116 an annular plug 117 is screwed into the threaded mouth 106 portion of the socket. Within the opening of plug 117 is a portion of a cylindrical enlargement 118 on the plunger. In front of the enlargement 118, the diameter of the plunger is reduced, as shown at 119, and this portion 119 has a close internal fit in an annular plug 120 which is screwed into an internally threaded hole 121 of the wall 23. In front of the plug 120 a nut 122 is screwed on a portion of the plunger which protrudes from the wall 23, and in this manner the plunger is firmly secured and anchored at its forward end to the wall 23 with the free rear end portion of the plunger extending into the socket provided in the clutch member E'. Normally, the spring 111 is expanded and the right hand washer is engaged with the bottom or rear end of its socket portion, and the left hand washer is in contact with the plug 117. The tendency of the spring 111 is to hold the clutch member E' in the disengaged position shown in Fig. 1, where its conical portions, adapted to cooperate respectively with the friction cone of the inner shaft and the friction cone of the outer shaft, are out of engagement with said cones. On the other hand, the friction member E', through the spring mechanism previously described, tends to hold the inner clutch member E" in the disengaged position.

I will now describe the means whereby the ring 76 of the clutch mechanism can be adjusted with precision in respect to its carrying part. There is provision for adjusting this member in a convenient manner from a position rearwardly of the friction clutch mechanism, which is accessible in the open forward end portion of the main housing. The ring 76 is provided on its inner surface with a series of spur teeth 123, and at a point in the circumference of this ring a small spur pinion 124 is in engagement with these teeth so that by a rotation of the pinion the ring can be screwed forwardly or rearwardly in order to obtain a precise adjustment. The pinion 124 is carried at the forward end of a small rotary shaft 125 having a bearing 126 in a central spider portion 127 of member E'. The shaft 125 extends rearwardly through the part 127 and through the aperture provided by ring 75, and has a polygonal rear end portion 128 adapted to be engaged by a suitable wrench for turning. After the shaft 125 has been turned the required extent, it is locked against angular movement by suitable means such as a locking arm 129 engaging the polygonal head and clamped in place by means including a clamping nut 130.

Upon each leg of each of the levers 66, there is provided suitable stop means for limiting the swinging movement of the lever in opposite directions. For this purpose, each leg of the lever may carry a stop projection 131 forwardly of the pivot and a similar projection 132 rearwardly of the pivot, these projections being adapted to take up against stop surfaces 133 with which the corresponding block 70 is provided.

The partition L previously mentioned is provided with suitable means acting in cooperation with the sliding and rotating sleeve 57 to create a seal, preventing leakage of lubricating oil from the closed portion of the main housing, and for this purpose the partition may be provided with a closing plate 134 carrying a sealing device 135 bearing against the sleeve 57.

The offset shaft H is surrounded by the sleeve portion 136 of a coupling member 137 projecting rearwardly out of the rear wall of the housing and adapted to be connected to the propeller shaft or other power takeoff. In the rear end wall of the housing is a sealing device 138 bearing against the sleeve 136. The sleeve 136 is surrounded by an anti-friction bearing 139 which is appropriately seated in the rear end portion of the housing structure. In front of the bearing 139, shaft H is surrounded by a thrust collar 140 which overlaps the inner race of the bearing 139. Forwardly of the thrust collar 140, the shaft H has a lateral flange 141 to the rim of which is connected by screws 142 an internal spur gear 143 forming part of the reduction gearing I previously mentioned. Forwardly of the flange 141, the shaft H has an integral cup-shaped portion 144 adapted to provide bearing means for the inner end of shaft H, and, surrounding the part 144, is an anti-friction bearing 145 which is illustrated as a roller bearing. The outer race of this roller bearing is held in a shallow central recess 146 in the rear face of a supporting yoke member 147 which is attached to and supported from a partition 148 provided in the housing A. The partition 148 is a transverse member which, in this particular case, is formed integrally with the forward section B of the housing at the rear end thereof. At its forward end portion, the supporting yoke member 147 is provided with lateral flanges 149 through which are passed screws 150 attaching it to the rear face of partition 148 in the manner shown in Fig. 7.

At its forward portion, at a point in line with the axis of shaft F, the yoke 147 is provided with a forwardly projecting boss 151. At the base of this boss is a shoulder 152, and, surrounding the boss and held in place against its shoulder, are two anti-friction bearings 153 and 154 arranged side by side and supporting on their outer races the surrounding pinion 155 which is connected to shaft F and meshes with internal gear 143. This spur pinion 155 is attached to shaft F by means of an integral flange 156 on the rear end of said shaft, through the rim of which flange are passed screws 157 engaging tapped openings in a portion of the pinion. The anti-friction bearings 153, 154 are held in place on the boss 151 by means of a shank 158 screwed into a socket 159 in the boss and carrying an external head 160 overlying the bearing 153.

The yoke member 147 is provided at its lower part, as shown in Fig. 1, with a forwardly facing socket portion 161 receiving the rear end of a pin 162, which pin has a forward end located forwardly of the partition 148 and mounted in an upstanding member 163 rising from the floor portion of the housing. Surrounding the pin 162 between the end supports thereof provided in parts 163, 161, respectively, is a pair of forward roller bearings 164 behind which is a spacing sleeve 165, there being behind the spacing sleeve a second pair 166 of roller bearings. These four roller bearings serve for mounting a long spur pinion 167 which has the rear portions of its teeth in mesh with the teeth of the internal gear 143. The forward end portions of the teeth of this pinion are in mesh with the teeth of a spur pinion 168 fixed to and driven from the shaft G and located forwardly of the partition member 148.

The pinion 168 has an integral forwardly extending supporting sleeve portion 169 which surrounds the body portion 36 of shaft G and is rigidly attached to it by means including splines 170. Internally of the pinion 168, which is of cup-shaped formation, is an anti-friction bearing 171. The inner race of this anti-friction bearing is held in place on a sleeve portion 172 surrounding the shaft F rearwardly of part 36 and formed integrally with an upright bracket member 173. The bracket member 173 is located in front of the partition 148 and is fastened to and supported from said partition through the use of a number of screws 174, one of which is shown in Fig. 1.

It will be understood from the foregoing that the partition 148, through the bracket member just described, supports the pinion driven from the outer shaft G, and that this partition, through the yoke member previously described, supports the pinion connected to the rear end of the shaft F and thereby supports the rear end of the shaft F, the yoke member in turn being partially supported by a stub portion projecting forwardly from the offset shaft H. It is also understood that the yoke member additionally supports the rear end portion of the long pinion 167 which is meshed on the one hand with the drive pinion of shaft G and, on the other hand, with the internal gear carried by the offset shaft.

For firmly supporting the actuating sleeve 57 in its different longitudinal positions, a guideway 175 is provided connecting the upper end portion of the upstanding member 163 to the partition L, said guideway comprising preferably a pair of horizontal guide bars 175a against which bear lugs 176 extending outwardly from the collar 60 at the lower part thereof. The collar 60 also carries at its upper portion (Fig. 6) lugs 177 engaged by longitudinal guide bars 178 supported from the partition L and projecting rearwardly therefrom.

Reference has previously been made to the spider portion 127, with which the clutch member E' is provided. This spider has, in all, three inwardly projecting arms 127ª and these arms have curved inner edges 127ᵇ making sliding contact with correspondingly shaped rib portions 127ᶜ on the fofward end portion of the sleeve 57.

It is believed to be apparent from the foregoing description that forward drive of the driven shaft H is obtained by clutching friction clutch member 30 to the engine-driven member so as to rotate the shaft F which, through its pinion 155, rotates the internal gear carried by shaft H, and that for reverse drive the shaft G is rotated by clutching member 37 to the engine-driven member. For the reverse drive, the pinion carried at the inner end of shaft G rotates the long pinion 167, and this pinion, acting on the internal gear, rotates the shaft H in the reverse direction.

In the neutral position shown in Fig. 1, the cone friction members carried by the respective drive shafts F and G are unaffected by the rotation of the parts E', E'', which, in rotating, have the positions shown in Fig. 1, in which there is ample clearance between the rotating and the stationary or idling parts of the friction clutch mechanism. When it is desired to obtain forward drive, the rock shaft J is turned from the position shown in Fig. 1 toward that shown in Fig. 2, in a counterclockwise direction with respect to Fig. 1, so as to pull the rotating sleeve 57 rearwardly and move each of the levers 66 toward the position of Fig. 2. At a certain point in the rearward swing of each lever 66, the rear roller thereof comes into contact with the sloping surface 83 of ring 75, and this has the effect of moving the member E' rearwardly in its guideway in the engine-driven member, and, due to the reaction, there is also the effect of moving forwardly the member E'' to which the lever 66 is pivoted. The separating action which takes place at this point between the rear part of the member E' and the body of member E'' is obviously in opposition to the action of the spring devices which normally hold the members E', E'' in the position of Fig. 1, and therefore there occurs a loading of the springs of these spring devices. As the movement of lever 66 toward the position of Fig. 2 continues, the rear roller rides up onto the surface 84 and the member E'' and the rear portion of member E' are then definitely held separated from each other to the maximum extent. In the meantime, the part 44 of E' has been moving rearwardly while the cone ring 54 of E'' has been moving forwardly and, when the position of Fig. 2 is reached, these two parts are strongly clamped upon the friction member carried by the inner shaft so as to drive the inner shaft through a very strong frictional connection in order to obtain forward drive. For moving the mechanism back again to neutral, the shaft J is turned in a direction to push the sleeve 57 forwardly again to the position of Fig. 1. When it is desired to obtain reverse drive, the shaft J is turned from the position of Fig. 1 in a clockwise direction so as to carry each lever 66 toward and into the position of Fig. 3. At a certain point in this movement, the roller in front of the pivot makes contact with the surface 86 on ring 76 and then rides onto surface 87, the action in this respect being similar to that previously described in connection with the rear ring 75. It will be noted that, in the position of Fig. 3, member E' is thrust forwardly to the maximum extent and the member E'' thrust rearwardly to the maximum extent, through the action of the lever pivoted to E'' and swung so as to have its roller 85 thrust against a surface carried by member E' at the rear thereof, just as in the forward drive position the roller 82 is thrust against a surface at the forward portion of the rear part or web of member E'. In the position of Fig. 3, the friction cone carried by the outer shaft is, of course, very strongly clamped between the cone ring 54 and the cone part 47, the effect being to drive the outer shaft in the proper direction to obtain reverse drive. Of course, in obtaining this clamping action just described, the spring devices associated with the clutch mechanism are loaded or energized in a manner similar to that in which they are loaded when the clutch is engaged for forward drive. Fig. 5 shows the loading of one of the spring devices between the two movable members of the clutch when the parts are in position for forward drive, and Fig. 2ᴬ shows the loading of one of the spring devices connecting member D with member E', when the parts are in forward drive position; and it is believed to be obvious from these views what positions will be taken by these spring devices in the position for reverse drive.

It will be noted that, in the improved mechanism, the clutch member carried by each of the independently rotatable shafts is a cone clutch member cooperating with a corresponding part carried by the engine-driven member, and it will be noted further that a very strong and rugged frictional connection is obtained because of the fact that each cone member carried by a shaft is adapted to be clamped by and between inner and outer friction surfaces carried by the other member of the mechanism. In the clutch mechanism as a whole there are, in all, eight cone friction surfaces, namely, one on the part 44; two on the clutch member carried by the inner shaft; two on the cone ring 54; two on the friction cone 38; and one on the part 47; and, in the operation of clamping either one of the shaft-carried cone members, four friction cone surfaces are employed, there being two separate movable members brought together and clamped on the interposed member. In this manner, a very powerful, reliable, and durable clutch is provided, the friction members being arranged compactly and in a small compass within the power-driven member. The positioning springs, moreover, are built into the structure within the lines of the engine-driven member where they are well housed and protected, while, nevertheless, they are readily accessible if, after long use, adjustments or repairs are necessary. The adjusting mechanism for the clutch members is also built into the structure within the lines of the engine-driven member and it enables very precise and exact adjustments to be made so that the clutch can give optimum performance; and the adjusting mechanism is simple and readily accessible. The friction clutch mechanism is of such a structure that, while the clutch is powerful, it does not grab or take hold suddenly. The well recognized benefits obtained from use of a cone clutch are present, and, on the other hand, the friction clutch mechanism has small bulk and weight and provides a relatively simple, inexpensive construction.

It will be understood that the levers, carried by the so-called inner member of the two relatively movable principal clutch members, have an action in the nature of a camming action upon the cooperating outer member for the purpose of obtaining an engagement of the two movable members upon the interposed element when the lever is thrust forwardly or rearwardly, as the case may be.

Various changes in the arrangement and organization of parts and in the details of the structure can be made without departing from the principles of the invention or the scope of the claims.

What I claim is:

1. In a transmission mechanism, the combination of concentric shafts each carrying rigid therewith a friction member, a driving member, friction clutch parts movable axially within said driving member and movable axially relatively to each other and adapted to clamp between them either of said friction members, resilient means normally holding said clutch parts in a predetermined relative axial position, and resilient means normally holding said clutch parts and said driving member in a predetermined relative axial position, said clutch parts comprising an outer enclosing part and an inner part enclosed thereby, said last named means connecting said engine-driven member with said outer part.

2. In a transmission mechanism, the combination of concentric shafts each carrying rigid therewith a friction member, a driving member, friction clutch parts movable axially within said driving member and movable axially relatively to each other and adapted to clamp between them either of said friction members, resilient means normally holding said clutch parts in a predetermined relative axial position, resilient means normally holding said clutch parts and said driving member in a predetermined relative axial position, said clutch parts comprising an outer enclosing part and an inner part enclosed thereby, said last named means connecting said driving member with said outer part, means for shifting said clutch parts axially relatively to each other, and adjusting means whereby the effect of said shifting means can be altered.

3. In a transmission mechanism, the combination of concentric shafts each carrying rigid therewith a hollow friction cone, a driving member, and friction clutch means for connecting either of said friction cones with said driving member, said cones being arranged one within the other in a radial direction in a common plane, said friction clutch means including a framelike part having an internal cone surface to engage the outer surface of the outer cone and an inner cone surface to engage the inner surface of the inner cone and said friction clutch means also including an inner part having an outer cone surface to engage the inner surface of the outer friction cone and an inner cone surface to engage the outer surface of the inner friction cone.

4. In a transmission mechanism, the combination of concentric shafts each carrying rigid therewith a hollow friction cone, a driving member, friction clutch means for connecting either of said friction cones with said driving member, said cones being arranged one within the other in a radial direction in a common plane, said friction clutch means including a framelike part having an internal cone surface to engage the outer surface of the outer cone and an inner cone surface to engage the inner surface of the inner cone and said friction clutch means also including an inner part having an outer cone surface to engage the inner surface of the outer friction cone and an inner cone surface to engage the outer surface of the inner friction cone, and actuating means for said clutch parts which move them axially relatively to each other by a camming action.

5. In a transmission mechanism, the combination of concentric shafts each carrying rigid therewith a hollow friction cone, a driving member, friction clutch means for connecting either of said friction cones with said driving member, said cones being arranged one within the other in a radial direction in a common plane, said friction clutch means including a framelike part having an internal cone surface to engage the outer surface of the outer cone and an inner cone surface to engage the inner surface of the inner cone and said friction clutch means also including an inner part having an outer cone surface to engage the inner surface of the outer friction cone and an inner cone surface to engage the outer surface of the inner friction cone, and actuating means for said clutch parts which move them axially relatively to each other by a camming action, said actuating means comprising camming levers which when moved in one direction cause the engagement of one of the friction cones and when moved in the opposite direction cause engagement of the other friction cone.

6. In a transmission mechanism, the combination of concentric shafts each carrying rigid therewith a web having opposite friction surfaces, a driving member, and means for clutching either of said webs to said driving member including a clutch part in the form of an open frame having at one end friction means to engage a friction surface of one of said webs and at the same end and radially inwardly of the first friction means a friction means to engage a friction surface of the other web and including an inner clutch part enclosed by the first mentioned part and movable axially relatively thereto and having friction surfaces to engage friction surfaces of the two webs.

7. In a transmission mechanism, the combination of concentric shafts each carrying rigid therewith a web having opposite friction surfaces, a driving member, means for clutching either of said webs to said driving member including a clutch part in the form of an open frame having at one end friction means to engage a friction surface of one of said webs and at the same end and radially inwardly of the first friction means a friction means to engage a friction surface of the other web and including an inner clutch part enclosed by the first mentioned part and movable axially relatively thereto and having friction surfaces to engage friction surfaces of the two webs, and means for actuating said friction clutch means comprising camming members carried by the inner clutch part engageable with camming surfaces disposed respectively forwardly and rearwardly of said camming members.

8. In a transmission mechanism, the combination of concentric shafts each having rigid therewith a hollow friction cone, said cones being disposed one within the other and each having substantially parallel inner and outer friction surfaces, a driving member, and friction clutch means for clutching either of said hollow cones to said driving member by engaging both friction surfaces of the cone.

9. In a transmission mechanism, the combination of concentric shafts each having rigid therewith a hollow friction cone, said cones being located one within the other in substantially the same plane, a driving member, and friction clutch means for clutching either of said hollow cones to said driving member, said friction clutch means being disposed outside of the outer cone, inside of the inner cone, and between the cones.

10. In a transmission mechanism, the combination of concentric shafts each having rigid therewith a cone friction member, a driving member, a friction clutch part guided longitudinally within said driving member, a second friction clutch part guided longitudinally within said driving member and comprising a frame within which said first-mentioned clutch part is enclosed, said clutch parts being provided with radially inner and outer surfaces so as to be adapted to clamp between them either of said friction cone members, and means for operating said clutch parts by moving one forwardly and the other rearwardly to clamp one of said cone members, and moving the first-mentioned part rearwardly and the other forwardly to clamp the other cone member.

11. In a transmission mechanism, the combination of a driving member in the shape of a cup, a pair of web friction members in the form of cones located within said cup and having portions disposed in substantially the same transverse plane and adapted for selective drive, means for selectively driving said friction members from said cup including a pair of friction members axially movable with respect to said cup and to each other and each having radially inner and outer clamping friction surfaces, and means for clamping one of said first friction members by moving one of said second friction members forwardly and the other rearwardly, and for clamping the other first friction member by moving the second friction members in directions opposite to those first mentioned.

12. In a transmission mechanism, the combination of concentric shafts each carrying rigid therewith a hollow friction cone, a driving member in the form of a cup facing toward said cones, and friction clutch means for connecting either of said friction cones with said cup including axially movable clutch parts splined peripherally to said cup and movable axially with reference thereto and to each other, one of said parts being in the form of a frame enclosing the other, said parts being separable in certain directions of movement thereof to clamp one cone and being separable in directions opposite to those first mentioned for clamping the other cone.

13. In a transmission mechanism, the combination of concentric shafts having concentric cone friction members lying in substantially the same plane, a driving member, and friction clutch parts guided axially within said driving member, said parts having portions separable from each other by movement in opposite directions to clamp one cone member and separable from each other in the opposite sense to clamp the other cone member.

14. The combination of concentric shafts each having rigid therewith a cone friction member, said friction members being disposed in a common transverse plane, a driving member in the form of a cup facing toward said friction members, friction clutch parts guided axially within said driving member adapted to clamp either of said friction cone members between them, and means for operating said clutch parts.

15. The combination of concentric shafts each having rigid therewith a cone friction member, said friction members being disposed in a common transverse plane, a driving member in the form of a cup in the bottom portion of which said friction members are disposed, friction clutch parts guided axially within said driving member and adapted to clamp either of said friction cone members between them, and means for operating said clutch parts, one of said parts being in the form of an open frame and the other part being enclosed within said frame.

16. The combination of concentric shafts each carrying rigid therewith a hollow friction cone, a driving member, and friction clutch means for connecting either of said friction cones with said driving member including relatively axially movable clutch parts, one of said parts being an inner enclosed part having camming levers mounted thereon and the other part enclosing said first part and being shiftable in opposite directions by said camming levers, and means for actuating said levers.

17. The combination of concentric shafts each carrying rigid therewith a hollow friction cone, a driving member, and friction clutch means for connecting either of said friction cones with said driving member including relatively axially movable clutch parts, one of said parts being an inner enclosed part having camming levers mounted thereon and the other part enclosing said first part and being shiftable in opposite directions by said camming levers, and means for actuating said levers, said outer part having axially adjustable means engageable with said levers.

18. A friction clutch comprising an outer hollow annular member, a pair of shafts concentric to each other and having portions located in the plane of said member, said portions respectively carrying outstanding webs having peripheral hollow friction cones, and a pair of clutch parts splined to said annular member and axially movable within said member and having portions adapted to engage one cone internally and externally and other portions adapted to engage the other cone internally and externally.

19. The combination of concentric parts each having rigid therewith a hollow friction cone, said cones being located one within the other in substantially the same plane, a hollow annular member enclosing said cones, and friction clutch means connected as by splines to said hollow annular member for clutching either of said cones to said member, said friction clutch means being disposed at one side only of said hollow annular member and being located outside of the outer cone, inside of the inner cone, and between the cones.

20. The combination of concentric parts each having rigid therewith a hollow friction cone, an annular member enclosing said cones, two oppositely movable friction clutch members connected to said last member for clamping either of said cones between them by engaging the cone externally and internally, and operating cam means interposed between said friction clutch members.

21. The combination of concentric shafts each carrying rigid therewith a hollow friction cone, a hollow annular member enclosing said cones, and friction clutch means connected as by splines to said hollow annular member for connecting either of said cones with said member by gripping the cone internally and externally, said clutch means comprising a clutch part in the form of an open frame having front and rear members and a second clutch part enclosed by said frame and provided with an annular body located between said front and rear members.

22. In a transmission mechanism, the combination of concentric shafts each having rigid therewith a hollow friction cone, a driving member, and two oppositely axially movable friction clutch members connected to said driving member and having radially inner and outer surfaces whereby said clutch members are adapted for clamping either of said cones between them by engaging the cone externally and internally.

23. The combination of concentric elements each carrying rigid therewith a hollow friction cone, said cones being in the same transverse plane, a hollow member enclosing said cones, an axially movable friction clutch means connected as by splines to said hollow member having radially inner and outer surfaces for connecting either cone with said hollow member by gripping the cone internally and externally.

JOHN O. BERNDTSON.

REFERENCES CITED

The following references are of record in the file of this patent:

UNITED STATES PATENTS

| Number | Name | Date |
|---|---|---|
| 1,345,688 | Moore | July 6, 1920 |
| 1,996,915 | Fleischel | Apr. 9, 1935 |
| 2,077,663 | Batten | Apr. 20, 1937 |
| 2,094,449 | Forichon | Sept. 28, 1937 |
| 2,099,141 | Railton et al. | Nov. 16, 1937 |
| 2,125,433 | Dunkelow | Aug. 2, 1938 |
| 2,127,713 | Batten | Aug. 23, 1938 |
| 2,214,164 | Fawick | Sept. 10, 1940 |
| 2,231,465 | Emrick | Feb. 11, 1941 |
| 2,333,037 | Osborn | Oct. 26, 1943 |
| 2,352,478 | Halford | June 27, 1944 |
| 2,386,541 | Campodonico | Oct. 9, 1945 |